2,398,698

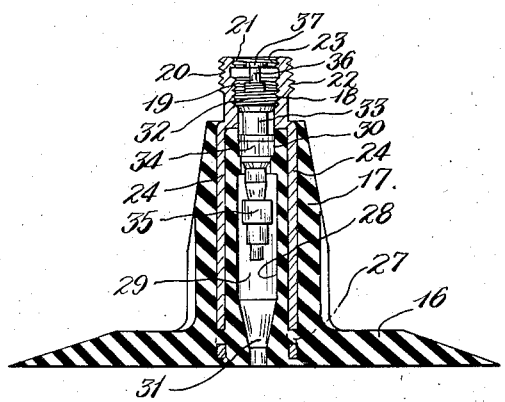
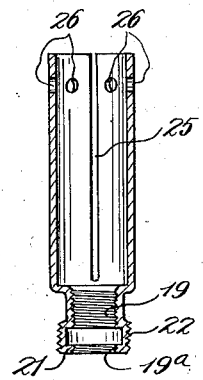
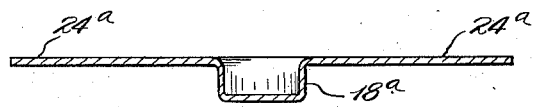
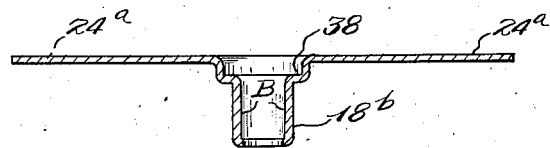
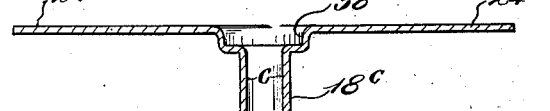
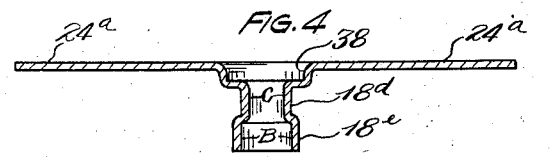
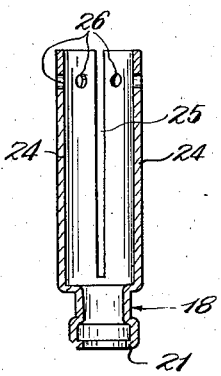
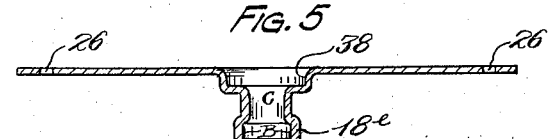
INVENTOR.
JOHN C. CROWLEY
BY Kwis Hudson & Kent
ATTORNEYS April 16, 1946. J. C. CROWLEY 2,398,698
METHOD OF MAKING INSERTS FOR RUBBER VALVE STEMS
Original Filed Feb. 28, 1942 2 Sheets-Sheet 2
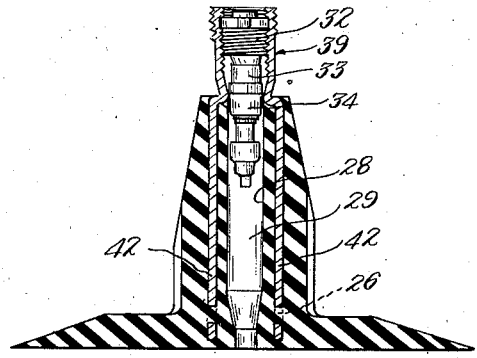
FIG. 9
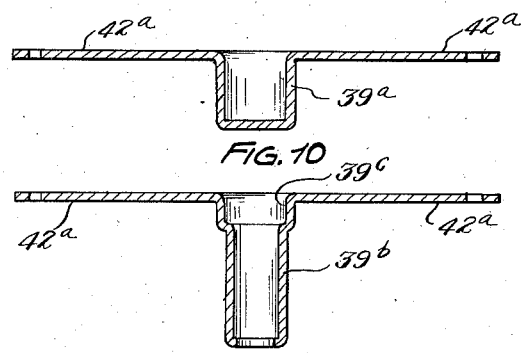
FIG. 10
FIG. 11
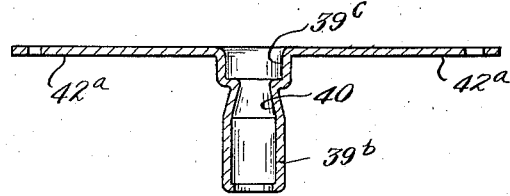
FIG. 12
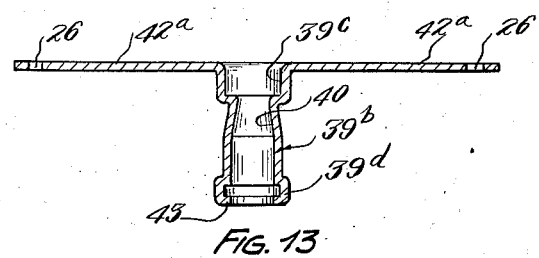
FIG. 13
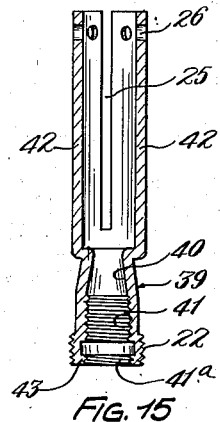
FIG. 15
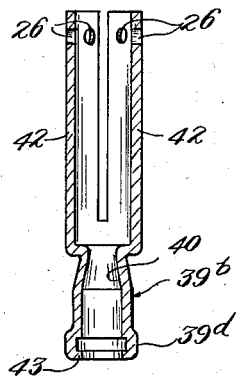
FIG. 14
INVENTOR.
JOHN C. CROWLEY
BY
Kwis Hudson & Kent
ATTORNEYS Patented Apr. 16, 1946

UNITED STATES PATENT OFFICE 2,398,698

METHOD OF MAKING INSERTS FOR RUBBER VALVE STEMS

John C. Crowley, Cleveland Heights, Ohio, assignor to The Dill Manufacturing Company, Cleveland, Ohio, a corporation of Ohio Original application February 28, 1942, Serial No. 432,863. Divided and this application September 12, 1942, Serial No. 458,088

2 Claims. (Cl. 29—157.1)

This invention relates to a method of making inserts for rubber valve stems and is a division of my application Serial No. 432,863, filed February 28, 1942.

An object of the invention is to provide an improved method of manufacturing valve core retaining inserts for rubber valve stems.

Another object is to provide an improved method of manufacturing valve core retaining inserts for rubber valve stems and which method enables the inserts to be formed of relatively thin gauge sheet material and yet be provided at their outer ends with both external and internal screw threads.

A further object is to provide a method of manufacturing valve core retaining inserts for rubber valve stems and which method enables the inserts to be efficiently and economically produced.

Further and additional objects and advantages not hereinbefore referred to will become apparent hereinafter during the following detailed description. Referring to the accompanying drawings, Fig. 1 is a sectional view through a valve core retaining insert made in accordance with the method of the invention and shows in section a rubber valve stem in which the insert is embedded, and also shows a removable valve core mounted in the insert and stem.

Fig. 2 is a sectional view through the blank from which the insert is constructed and shows the same after the first drawing operation has been performed on the blank.

Fig. 3 is a view similar to Fig. 2 but illustrates the condition of the blank after a second drawing operation has been performed on the blank.

Fig. 4 is a view similar to Fig. 3 and illustrates the condition of the blank when the second drawing operation employed produces an elongated tubular portion on the blank of smaller diameter than the corresponding portion shown in Fig. 3.

Fig. 5 is a sectional view through the blank to illustrate the condition of the same after the third operation has been performed thereon and which third operation is a forming one and may be applied to either the blank shown in Fig. 3 or that shown in Fig. 4.

Fig. 6 illustrates the condition of the blank shown in Fig. 5 after the fourth forming operation has been applied thereto.

Fig. 7 is a sectional view through the insert after the legs or skirt thereof have been transversely arched and bent into substantially cylindrical form.

Fig. 8 is a sectional view through the finished insert and illustrates the insert after the external and interal screw threads have been formed in the tubular end of the insert.

Fig. 9 is a view similar to Fig. 1 but shows a modified form of insert produced by the method of the present invention.

Figs. 10 to 15 inclusive are views illustrating the condition of the blank in the successive stages of producing the insert therefrom and after the various drawing, forming and screw threading operations have been applied thereto.

Referring to Fig. 1, the rubber valve stem shown therein comprises a rubber base 16 and a rubber stem proper portion 17 integral with the base and extending outwardly from the center of the base. The valve core retaining insert made by the method of the present invention is secured in the rubber stem by vulcanization and in the location indicated in Fig. 1. This insert is made from suitable thin gauge sheet material, such as thin gauge sheet steel, wherefore drawing and forming operations can be employed in its manufacture. The finished insert has a tubular outer end 18 which is internally threaded as indicated at 19. The tubular outer end of the insert at the extreme outer end thereof has a radially enlarged portion 20, the free end of which is provided with a radially inwardly directed flange 21. The enlarged portion 20 is exteriorly threaded, as indicated at 22, to enable a valve or dust cap to be screwed onto the insert if desired. The inner periphery of the flange 21 defines an opening of the same diameter as the internally threaded bore of the insert and is provided with screw threads 23 which constitute actually a continuation of the internal threads 19.

As already stated, the insert is made from thin gauge sheet material and such material is not sufficiently thick to permit forming both internal and external threads therein at the same location. Consequently the provision on the insert of the enlarged portion 20 and the inwardly extending flange 21 overcomes this difficulty and it is possible to provide the external threads 22 for the valve cap and at the same time to have the bore in the outer end of the insert internally threaded with the threads 23. The unthreaded offset connecting the enlarged portion 20 with the remainder of the tubular portion of the insert provides the required metal so that the external threads 22 and the internal threads 19 can overlap. The flange 21 provides the required metal thickness for the overlapping external threads 22 and the internal threads 23. The tubular outer end portion 18 of the insert has integral legs 234 extending from its inner end. The legs 24 are arcuate or bowed in cross section from near their upper ends to their lower ends and are separated by diametrically opposed longitudinally extending spaces 25. The legs 24 when the insert is in its finished form constitute what may be termed a substantially cylindrical skirt or sleeve provided with elongated diametrically opposed slots formed by the spaces 25. Each of the legs 24 of the insert is provided near its lower end with a plurality of openings 26.

The insert in its finished form is molded in the rubber valve stem, preferably when the latter is molded and vulcanized to cure the same. The tubular outer end portion 18 of the insert extends beyond the outer end of the stem proper portion 17 of the rubber valve stem, while the legs 24 that form the skirt or sleeve of the insert are embedded in the rubber valve stem and extend almost to the flat surface of the base 16 of the rubber valve stem and which base contacts the inner tube or other inflatable article to which the stem is attached in use.

The rubber of the valve stem is molded on the insert both interiorly and exteriorly thereof and extends through the openings 26 in the legs 24 of the insert, as indicated at 27 in Fig. 1 and also through the spaces 25. The rubber molded on the interior of the skirt or sleeve of the insert is indicated at 28 and extends from the said flat surface of the base 16 outwardly to the junction of the skirt or sleeve of the insert with the tubular outer end portion thereof. The rubber valve stem, and particularly the portion formed by the rubber material 28 within the skirt of the insert, is provided with a bore 29 therethrough and which bore has a reduced portion 30 and is provided near its inner end with an internal shoulder 31.

In Fig. 1 a conventional removable valve core 30 is shown mounted in operative position in the valve stem. This valve core comprises an externally threaded plug 32 which is swivelly connected to a barrel 33 that has intermediate its ends and externally thereof a tapered gasket 34. The lower end of the barrel 33 constitutes a valve seat with which a valve 35 engages in air-sealing relationship. The valve 35 is fixed on the lower end of a valve pin 36 that extends through the barrel 33 and the plug 32 and is provided at its outer end with a head 37 adapted to be engaged by the pin of the ordinary air chuck to unseat the valve 35 when air is passing through the valve stem and valve core. The valve core is operatively mounted in the valve stem by screwing the threaded plug 32 thereof into the tubular internally threaded outer end portion 18 of the insert until the tapered external gasket 34 on the barrel 33 of the core is in air-sealing engagement with the reduced portion 30 of the bore 29 through the valve stem.

In accordance with the present invention the insert is formed from relatively thin gauge sheet material, such as sheet steel, principally by means of die stamping in the nature of drawing and forming operations. A flat blank of the sheet material of suitable size is first stamped by suitable dies to draw a cylindrical relatively short cup 18a centrally of the blank and midway of its ends and from the open circumferential end of which extend in diametrical alignment flat legs 24a. The blank after the first operation thereon is illustrated in Fig. 2.

A second drawing operation is then performed on the blank by means of suitable dies to elongate the cup 18a and somewhat reduce it in diameter from its closed or bottom end inwardly to a portion 38 adjacent the legs 24a and which remains at the same diameter as the diameter of the short cup 18a drawn by the first operation.

Concurrently with the second drawing operation the closed bottom of the cup is cut out or removed. The second drawing operation may elongate the cup to a diameter B to form an elongated open ended tubular portion 18b, as indicated in Fig. 3, or the second operation may draw the cup into narrower elongated form with diameter C to provide an open ended elongated tubular portion 18c, as indicated in Fig. 4.

If the second drawing operation has produced a tubular portion 18b with diameter B, as indicated in Fig. 3, then the third operation is a forming operation by means of suitable dies to reduce the portion 18b adjacent to the enlarged portion 38 to diameter C and thus provide an inner portion 18d of reduced diameter integrally connected at its outer end to an outer portion 18e of larger diameter, namely the diameter B, as shown in Fig. 5.

If the second drawing operation produced the tubular portion 18c of C diameter, then the third and forming operation would, by means of suitable dies, expand the outer end 18e of the tubular portion to B diameter, also clearly shown in Fig. 5.

The fourth operation includes the piercing of the legs 24a to provide the openings 26 therein, and further includes forming by means of suitable dies the flange 21 on the portion 18e, as indicated in Fig. 6, with the inner periphery of the flange 21 defining an opening having the diameter C. When the insert has reached this point in its manufacture the legs 24a are flat and extend substantially perpendicularly from the tubular portion of the blank as indicated in Fig. 6.

The next operation presses by means of suitable dies the flat legs 24a into arcuate shape in cross section and bends said legs into parallel relationship to provide the finished legs 24 and which constitute the extended substantially circular elongated slotted skirt or sleeve of the finished insert and which skirt or sleeve forms an extension of the portion 38 of the insert. The insert when it has reached this stage in its manufacture is as indicated in Fig. 7.

Although the internal threads 19 and 19a and the external threads 22 might be formed on the insert when it has reached that stage of its manufacture indicated in Fig. 6, the present disclosure, for purposes of illustration, indicates that the exterior and interior threads are formed on the tubular portion 18 subsequent to that stage of the manufacture of the insert indicated in Fig. 7.

The external threads 22, the internal threads 19, and the threads 19a on the inner periphery of the flange 21 are formed in the tubular portion 18 of the insert by any suitable thread forming means, it being understood that the threads 19 and 19a may be formed in the same threading operation and by the same threading tool.

As already explained the sheet material is too thin to permit the formation of both internal and external threads therein on opposite sides of the same portion of the insert, but by providing the enlarged portion 18e and then the inwardly extending flange 21 this difficulty is overcome and the internal threads 19a and 19 and the external threads 22 can be formed in the tubular portion of the insert, with the threads 19 overlapping the external threads 22.

It will be understood that the method of making the insert by means of drawing and forming operations and from sheet material, as just explained, is more efficient, more economical and more readily accomplished than the manufacture of similar inserts from heavier gauge material by means of time consuming and expensive machining operation.

The valve core retaining insert shown in Figs. 9 to 15 inclusive differs from the insert previously described in that the outer tubular end portion 39 of the modified insert is longer than the corresponding portion 18 of the first described insert. The bore of the outer tubular portion 39 of the insert is provided adjacent its inner end with a smooth tapered portion 40, while the internal threads 41 which correspond to the internal threads 19 of the first described insert extend a greater length in the bore of the modified form of insert.

When the modified form of insert is used the bore 29, through the rubber valve stem, does not have the reduced bore portion 30 of the first described form, since when the removable valve core is mounted in the rubber stem shown in Fig. 9 the tapered gasket 34 of the barrel 33 engages the tapered smooth bore portion 40 of the outer tubular end 39 of the insert in addition to engaging the upper end of the rubber material of the stem located within the skirt of the insert.

The modified insert is provided with legs 42 corresponding to the legs 24 of the previously described form and which legs are separated with the longitudinally extending spaces 25 and are provided adjacent their free ends with the plurality of openings 26. The modified insert is made in substantially the same way as the first described form of insert, as clearly indicated in Figs. 10 to 15 inclusive.

The first drawing operation upon the blank produces the relatively short closed bottomed cup 39a, from which extends in diametrical alignment the legs or arms 42a, as shown in Fig. 10.

The second drawing operation on the blank produces the reduced diameter elongated open ended tubular portion 39b extending outwardly from the larger diameter portion 39c at the junction of the cup with the arms 42a. The second operation also removes the closed bottom of the cup.

The third operation is a forming operation which by means of suitable dies constricts the portion 39b to provide the tapered smooth bore portion 40 in the tubular outer end of the insert.

The next and fourth operation (not specifically shown in the drawings) radially expands the outer end of the tubular portion 39b in a manner corresponding to the third operation on the first described form of insert as illustrated in Fig. 5, and forms the portion 39d.

The third and fourth operations on the modified form of insert may be performed simultaneously, if desired.

The fifth operation in the manufacture of the modified insert corresponds to the fourth operation on the first described form, as shown in Fig. 6, and embodies the formation of the inwardly extending flange 43 at the free end of the radially expanded portion 39d of the insert and the punching of the openings 26 in the arms 42a, see Fig. 13, and which flange 43 corresponds to the flange 21 of the first described form.

The sixth operation in the manufacture of the modified insert corresponds to the fifth operation performed on the first described insert as illustrated in Fig. 7 and includes the arching of the legs 42 in cross section and the bending of said legs to provide the extended substantially circular elongated slotted skirt or sleeve of the finished insert, see Fig. 14.

The next operation on the modified insert is the threading operation to provide the external threads 22, the internal threads 41 and the threads 41a on the periphery of the flange 43 as indicated in Fig. 15 and is the same as the corresponding operation on the first described form of insert.

Although the invention has been described as including a certain arrangement or order of manufacturing steps on the blanks in the production of the finished inserts, it will be understood that this order may be varied somewhat within the scope of the appended claims.

Having thus described my invention, I claim:

1. A method of manufacturing inserts for rubber valve stems which comprises forming a blank of relatively thin gauge sheet material by means of a drawing operation to have a centrally located cup from which diametrically aligned legs extend substantially perpendicularly thereto, then by means of drawing and stamping operations elongating said cup into an open ended tubular portion having a part of larger diameter adjacent the said legs and a part of reduced diameter remote from said legs, then by means of forming operations shaping said latter part to have the outer end of said part of greater diameter than the inner end thereof, then flanging the tip of said outer end of said latter part radially inwardly to define an opening substantially of the same diameter as the internal diameter of the inner end of said part, then arching said legs in a transverse direction and bending the same from the perpendicular relationship with said tubular portion into a position in longitudinal extension thereof and wherein they form a substantially circular skirt integral with said tubular portion, and then subjecting the inner periphery of said flange and the interior of said latter part to threading operations to provide corresponding screw threads thereon.

2. A method of manufacturing inserts for rubber valve stems which comprises forming a blank of relatively thin gauge sheet material by means of a drawing operation to have a centrally located cup from which diametrically aligned legs extend substantially perpendicularly thereto, then by means of drawing and stamping operations elongating said cup into an open ended tubular portion having a part of larger diameter adjacent the said legs and a part of reduced diameter remote from said legs, then by means of forming operations constricting said latter part adjacent to said first named part to provide a tapered portion on said latter part, then by means of forming operations radially expanding the outer end of said latter part, then flanging the tip of said expanded outer end of said latter part radially inwardly to define an opening substantially of the same diameter as the internal diameter of the part inwardly of its expanded outer end, then arching said legs in a transverse direction and bending the same from their perpendicular relationship with said tubular portion into a position in longitudinal extension thereof and wherein they form a substantially circular skirt integral with said tubular portion, and then subjecting the inner periphery of said flange and the interior of said latter part to threading operations to provide corresponding screw threads thereon.

JOHN C. CROWLEY.